Feb. 28, 1961     H. W. ZUCH ET AL     2,973,405
ELECTRICAL DISTRIBUTION BUS DUCTS
Filed Feb. 21, 1958     2 Sheets-Sheet 1
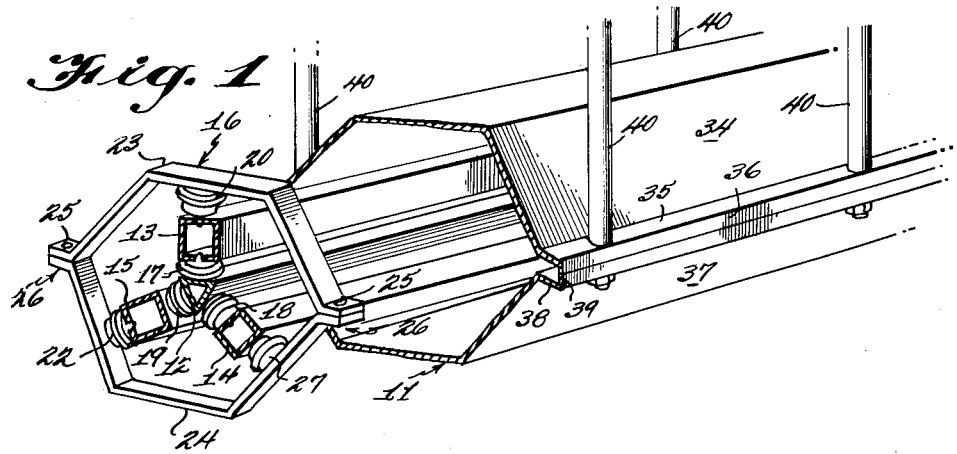
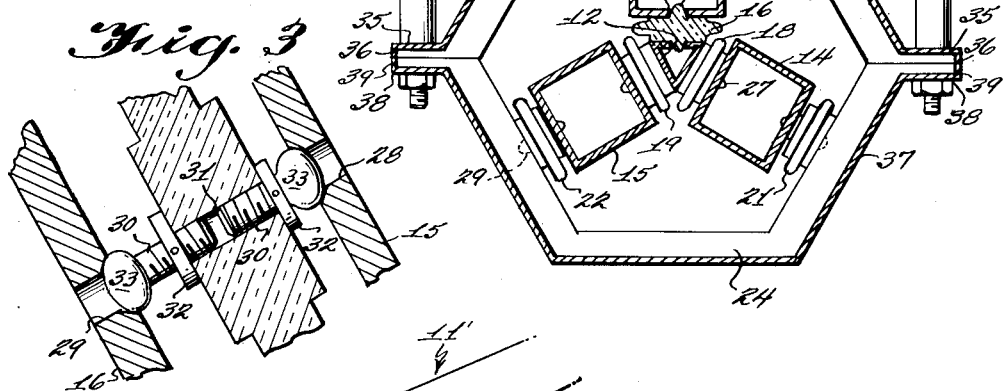
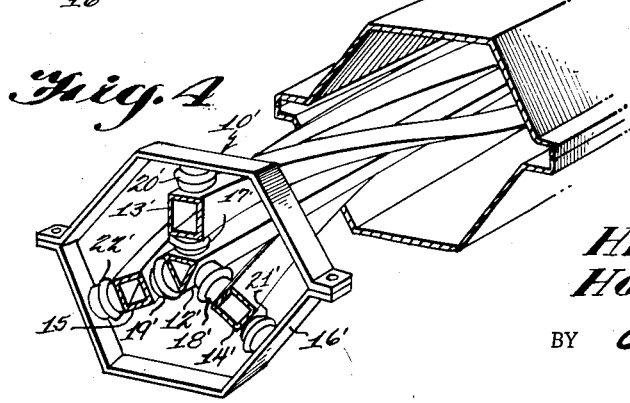
INVENTORS
HELMUTH W. ZUCH
HOWARD W. ZUCH
BY Adams + Bush
ATTORNEY

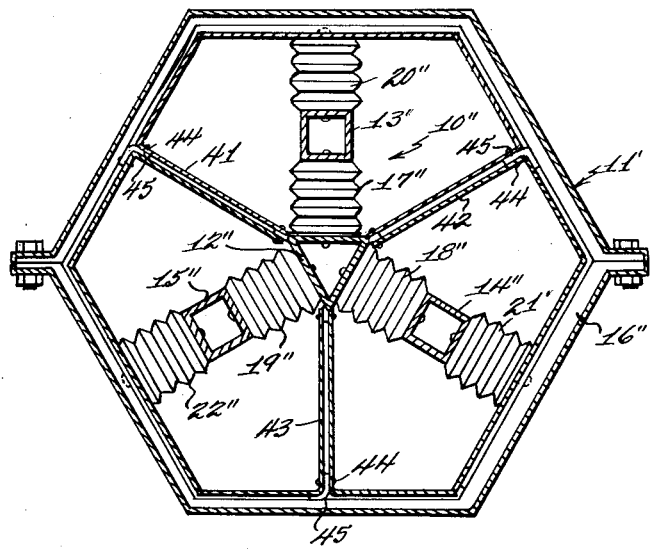
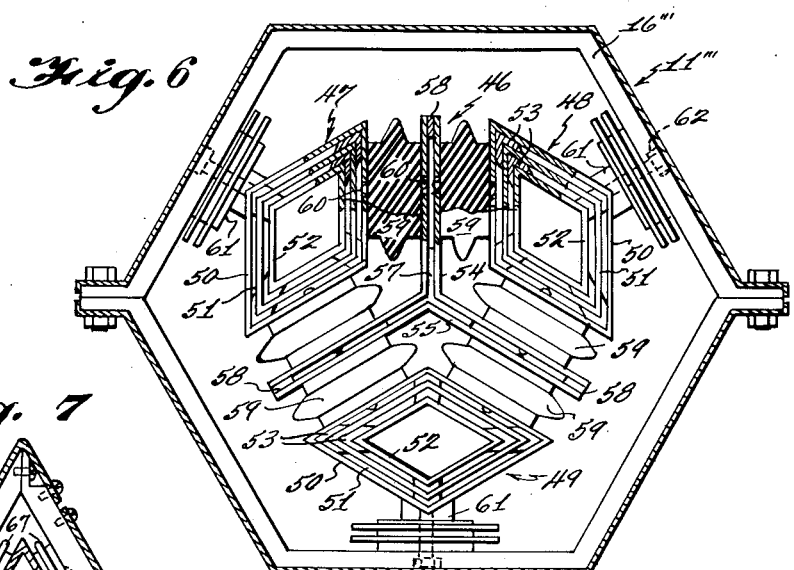
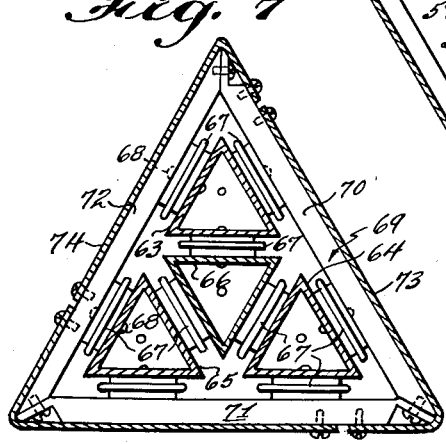
INVENTORS
HELMUTH W. ZUCH
HOWARD W. ZUCH
BY Adams + Bush
ATTORNEY United States Patent Office 2,973,405
Patented Feb. 28, 1961

2,973,405
ELECTRICAL DISTRIBUTION BUS DUCTS
Helmuth W. Zuch and Howard W. Zuch, both % H. W. Zuch Co., P.O. Box 122, Austin 62, Tex.
Filed Feb. 21, 1958, Ser. No. 716,622
5 Claims. (Cl. 174—99)

This invention relates to electrical distribution systems and has more particular reference to electrical distribution systems of the bus duct type wherein a plurality of bus bars are run parallel to each other within an enclosing duct.

One object of the present invention is to provide a novel and improved electrical distribution system of the bus duct type in which a unitary bus bar assembly, comprising a plurality of conductors arranged about a central neutral conductor, are mounted within a protective duct.

Another object of the invention is to provide a novel and improved bus duct, as characterized above, in which the bus bar assembly comprises three current carrying conductors spaced from and extending in parallel relation to a neutral central conductor in circumferentially spaced position, the relation being such that the three current carrying conductors run substantially at the points of an equilateral triangle with the longitudinal axis of the neutral conductor located at the center of the triangle.

Another object of the invention is to provide a novel and improved bus duct, as characterized above, in which the four conductors of the bus bar assembly are supported in spaced relation from each other and within the duct by means of supporting frames encircling the conductors and spaced at predetermined intervals along the run of the conductors with the conductors at each frame being held in predetermined spaced relation by means of insulators.

Another object of the invention is to provide a novel and improved bus duct, as characterized above, in which the insulators are made adjustable to permit varying the spacing of the three current carrying conductors from the neutral conductor.

Another object of the invention is to provide a novel and improved bus duct, as characterized above, in which the conductors are made of bare or insulated non-ferrous metal with the center conductor triangular to assure the proper electrical relationship.

Another object of the invention is to provide a novel and improved bus duct, as characterized above, in which the three outer conductors extend about the central neutral conductor in a spiraling relationship to eliminate extraneous imposed frequencies on the basic frequency cycle of the bus assembly.

A further object of the invention is to provide a novel and improved bus duct, as characterized above, in which the four conductors are separated from each other within the duct by encircling baffle members in a gas and arc-proof arrangement extending the length of the duct to provide for isolated phase or segregated phase when high voltage current is used.

A further object of the invention is to provide a novel and improved bus duct, as characterized above, which is simple in construction, mechanically strong, electrically efficient in operation, and which can be manufactured and shipped as a unit ready for installation and is adjustable on the job.

Other objects and advantages of the invention will appear in the following specification when considered with the accompanying drawings, wherein:

Fig. 1 is a perspective view, partly in section, of one embodiment of a bus duct constructed in accordance with the present invention;

Fig. 2 is a vertical sectional view of the bus duct shown in Fig. 1, showing the interior thereof and the arrangement of the bus conductors;

Fig. 3 is a sectional detail view showing a modified manner of mounting the insulators shown in Fig. 2;

Fig. 4 is a view similar to that shown in Fig. 1, but showing a special arrangement and mounting of the bus tubes in the duct;

Fig. 5 is a view similar to that shown in Fig. 2, but showing baffle partitions mounted in the bus duct;

Fig. 6 is a view similar to that shown in Fig. 2, but showing modified types of bus tubes and a Y neutral bar and the manner in which they are mounted in the bus duct; and Fig. 7 is a view similar to that shown in Fig. 2, but showing a triangular shaped bus duct having triangular shaped bus tubes and neutral conductor mounted therein.

Referring now to the drawings, there is illustrated, in Figs. 1 and 2, one embodiment of an electrical distribution system bus duct assembly constructed in accordance with the present invention. As there shown, the bus duct assembly comprises a bus bar assembly, indicated generally at 10, mounted within and extending through a duct assembly, indicated generally at 11.

The bus bar assembly is a unitary structure comprising a central triangular neutral conductor 12, and three current carrying conductors 13, 14 and 15 are spaced from and extend parallel to the neutral conductor in an equilateral triangle formation, the relation being such that at every point along the longitudinal axis of the bus bar assembly the longitudinal axes of the three current carrying conductors run at the points of an equilateral triangle having its center coinciding with the longitudinal axis of the neutral conductor.

The four conductors are held in their spaced-apart relationship by surrounding and supporting frames 16 spaced longitudinally apart a predetermined distance, depending upon the size of the conductors. At each frame the three current carrying conductors 13, 14 and 15, are spaced predetermined distances from the neutral conductor 12 by means of insulators 17, 18 and 19, respectively, and are spaced a predetermined distance from the frame 16 by insulators 20, 21 and 22, respectively.

The four conductors may be tubular or solid and of any desired shape in cross section, and made of any suitable conducting material. Preferably, and as shown, the neutral conductor 12 is tubular and of triangular cross section, and the three conductors 13, 14 and 15 are tubular and rectangular in cross section, and all are made of bare copper metal. Thus, the conductors are air cooled and self-cooling.

The frames 16 are made of any suitable material and may be of any desired shape, depending upon the shape of the conductors. Preferably, and as shown, the frames are made of aluminum and are of a hexagonal shape to readily support the conductors. The frames 16 are identical in construction and, as shown, each is made in two semi-hexagonal parts, an upper part 23 provided with outwardly extending flanges at each end and a lower part 24 provided with outwardly extending flanges at each end. The upper and lower parts are secured together by any suitable means such as countersunk screws or bolts 25 passing through the superimposed flanges of the two parts to provide the complete frame having opposed flanges 26 which provide means for securing the frames in the duct in a manner hereinafter to be described.

The insulators 17, 18 and 19 may be of any suitable size and shape and made of any suitable material. Preferably, and as shown, they are generally disc-shaped and of the required thickness and are made of a plastic phenol compound which has high dielectric strength as well as mechanical flexibility. These insulators are provided with integral projections 27 on opposite sides thereof. The projections 27 have rounded ends which fit with a ball and socket action into round holes 28 formed in the tubular conductors. This construction provides for relative movement between the conductors, due to expansion and contraction, and in case of slight mechanical misalignment or shock.

The insulators 20, 21 and 22 are mounted between the conductors 13, 14 and 15, respectively, and the frames 16 are made of the same material and are identical in construction and mounting to the insulators 17, 18 and 19. The outer projections 27 of the insulators 20, 21 and 22, are received in rounded holes 29 formed in the frame members 16.

In Fig. 3 there is illustrated a modified form of insulator which can be used in place of the insulators illustrated in Figs. 1 and 2. In the modified form the projections are in the form of threaded studs 30, adjustably threaded into a threaded bore 31 extending through the insulator with the studs projecting on opposite sides of the insulator and with each stud carrying a thin lock nut 32 provided with a set screw. The outer ends of the studs 30 have a ball-like head 33 formed thereon adapted to fit in the rounded holes 28 and 29 formed in the conductors and frame members, respectively, to provide a ball and socket-like connection therebetween, thus providing for relative movement between these members.

The use of insulators, as above described, with their threaded stud projections and lock nuts, provides for ready setting and adjustment of the spacing between the conductors, whereas, when insulators with integrally formed projections are employed, such spacing adjustment can only be made by replacing insulators of one thickness with insulators of another thickness.

From the foregoing, it is readily apparent that when a series of described sets of insulators and their supporting frames are spaced at intervals along the run of the conductors, there will result a self-sustaining unitary bus bar structure capable in itself of withstanding overload and short circuit stresses substantially without distortion and providing extremely high efficiency of power transmission with lower voltage drops and power losses.

The duct assembly 11 is made of a shape to readily house and support the bus bar assembly and may be made of any suitable material. Preferably, and as shown, it is made of formed aluminum sheets in a two part construction, hexagonal in cross section and fitted to tightly engage the frames of the bus bar assembly when mounted therein. Preferably, and as shown, the duct is made in two parts; an upper part 34 provided with outwardly extending flanges 35 along its longitudinal edges with each flange having a down-turned edge portion 36 and a lower part 37 provided with outwardly extending flanges 38 along its longitudinal edges with each flange having an upturned edge portion 39 adapted to engage the downturned edge portion of the upper part 34 and provide a space or channel between the upper and lower flanges 35, 36, in which are received the outwardly extending flanges 26 of the frame members. The upper and lower parts of the duct may be secured together by suitable bolts and nuts or the like and may be provided with longitudinally spaced pairs of hangers 40 having threaded end portions which pass through the flanges of the duct and are secured thereon by nuts, with the upper ends of the hangers provided with any suitable means (not shown) to permit their being secured to a casting or the like.

A bus duct assembly constructed as above described, employing three tubular conductors place about a central triangular neutral conductor with the centers of the three conductors spaced equal distances from the center of the neutral conductor at the points of an equilateral triangle, provides maximum air cooling, maximum resistance to short circuit stresses, and the insulator assembly construction provides flexibility to prevent shock and mechanical damage, and provides for uniformly varying the impedance relationship between the conductors by change of the insulator positioning and spacing between all conductors, thus providing a particularly electrically efficient system.

In Fig. 4 there is illustrated a modified form of bus duct assembly particularly designed to neutralize and/or eliminate harmonic voltage interference or any communication system interference, such as extraneous imposed frequencies on the basic frequency cycle being transmitted by the bus bar assembly. In this modification, the bus bar assemblies are identical in construction to the corresponding assemblies shown in the modification illustrated in Figs. 1 and 2, except that the current carrying conductors 13', 14' and 15' are arranged to spiral around the straight neutral triangular conductor 12' between the supporting frames 16'. The three conductors 13', 14' and 15' all spiral in the same direction, either clockwise, as shown, or counterclockwise, so that their position in the next succeeding frame will be angularly changed 120° about the neutral conductor 12' from their position in the preceding frame. The insulators 17', 18', 19', 20', 21' and 22' employed to hold the conductors in spaced relative position within the frames are identical in construction and arrangement wtih the corresponding insulators employed in the construction shown in Figs. 1 and 2, or may be similar to the insulators shown in Fig. 3. The frame members 16' and the duct assembly 11' in which the bus bar assembly 10' is housed and supported are substantially identical in construction and arrangement to the corresponding parts shown in Figs. 1 and 2.

In Fig. 5 there is illustrated a modified form of a bus duct assembly particularly designed for use when high voltage isolated phase or segregated phase construction is required. In this particular modification, the bus bar assembly 10", the duct assembly 11", and the frame members 16" are substantially identical in construction and arrangement to the corresponding assemblies shown in Figs. 1, 2 and 3, except that the insulators 17", 18", 19", 20", 21" and 22" are larger to space the current carrying conductors 13", 14", 15" further from the neutral conductor 12" and the frames 16". The conductors 13", 14", 15", and their supporting insulators are enclosed in tubular baffle or partition members 41, 42 and 43, respectively, which extend the length of the bus bar assembly and are pentagonal in cross section with their outer walls shaped to conform to the adjacent inner walls of the frames 16". The baffle members preferably are made of aluminum sheet enclosures in a gas and/or arc-proof arrangement and are secured to each other in spaced relation and to the frame members 16" by any suitable means such as bolts 44 passing through spacer blocks 45.

In Fig. 6 there is illustrated a modified form of a bus duct assembly particularly designed to provide for mechanical and electrical shock adsorption and for ventilating and cooling. In this particular modification, the duct assembly 11''' and the frame members 16''' of the bus bar assembly are identical in construction to the corresponding parts shown in Fig. 2. The equilateral triangular arrangement of the conductors in the bus bar assembly is the same as in the previous described modification; however, the central neutral conductor 46 is Y-shaped in transverse cross section and the three outer conductors 47, 48 and 49 are each made up of three tubular members 50, 51 and 52 diamond shaped in transverse cross secton, telescoped one within the other, as shown, and spaced from each other by elongated Λ-shaped spacing members 53 made of the same metal as the tubular members.

The Y-shaped neutral conductor 46 is formed of three elongated strips of flat metal, 54, 55, 56, each bent into a V-shape with its legs extending outwardly from each other at a 120° angle. The three strips are secured to a Y-shaped metal strip 57 which holds them in spaced apart relation and the outer adjacent ends of the strips 54, 55 and 56 are provided with metal spacer members 58 so that each leg of the neutral conductor is made tubular. The three current carrying conductors 47, 48, 49 are mounted in the space between the legs of the Y-shaped neutral conductor, with their walls extending parallel to and spaced from the adjacent sides of the legs of the neutral conductor by insulators 59 located at each frame. The insulators 59 are preferably made of the same material as the insulators previously described herein and each is provided with projections 60 on opposite ends adapted to be received in round holes formed in the outer walls of the neutral conductor and the current carrying conductors. Each of the outer conductors at each frame is held in spaced relation to the frame by an insulator 61. The insulators 61 are preferably made of the same material as the insulators 59 and each is provided with a solid cylindrical inner end having a V-shaped slot formed therein in which is received the V-shaped outer edge of the conductor. The outer ends of the insulators engage the inner surface of the frame member and are held in position by threaded studs 62 having heads countersunk in the frame member with their threaded inner ends adjustably threaded into a threaded bore in the insulator.

In Fig. 7 there is illustrated a modified form of a bus duct assembly in which the duct, the tubular neutral conductor and the three tubular current carrying conductors are triangular shaped in transverse cross section. In this particular modification the three tubular current carrying conductors 63, 64 and 65 are arranged about the central neutral conductor 66 in the same equilateral formation as are the corresponding members shown in Fig. 2. The four conductors are held in spaced apart relation from each other and the frames by insulators 67. The insulators 67 are made of the same material as the insulators shown in Fig. 2, and each is provided on opposite sides with an integral projection 68 adapted to be mounted in a round hole formed in the adjacent conductor or frame member.

The triangular shaped frame 69 is shown as being made in three sections 70, 71 and 72, suitably secured together as by bolting, which together encircle the four conductors.

The triangular shaped duct is shown as being made in two sections 73, 74, which together enclose the bus bar assembly and are secured to the frames thereof as by metal screws.

While the bus duct assembly of this modification may be provided with strap means for suspension from the ceiling of a building structure, it is contemplated that it would be mounted by being set into the corners of chases or rooms, thus leaving maximum flat wall space.

From the foregoing, it readily will be seen that there has been provided a novel and improved bus duct assembly for use in electrical distribution systems, one which provides maximum cooling, maximum resistance to mechanical and electrical shocks, minimum voltage drop and power losses, and means for adjusting the spacing between the conductors to obtain variable impedance characteristics as required, and also provides means for eliminating extraneous imposed frequencies on the basic frequency cycle of the bus bar assembly, as well as means to provide for isolated phase or segregated phase when high voltage is used.

Obviously, the invention is not restricted to the particular embodiments thereof herein shown and described. Moreover, it is not indispensable that all of the features of the invention be used conjointly, since they may be employed advantageously in various combinations and sub-combinations.

What is claimed is:

1. In an electrical distribution bus duct, a bus bar assembly including four conductors, a tubular neutral conductor triangular in transverse cross section, three tubular current carrying conductors rectangular in transverse cross section, said current carrying conductors being circumferentially equally spaced about said neutral conductor in an equilateral triangle formation, insulators spaced longitudinally along the run of the four conductors for holding the three current carrying conductors at predetermined distances from the neutral conductor, said insulators being positioned between the neutral conductor and the current carrying conductors with each insulator engaging the neutral conductor and one of the current carrying conductors; and means for holding said insulators and said conductors clamped together including a two-piece member encircling said conductors and carrying a plurality of insulators each positioned to engage and support one of the three current carrying conductors, the construction and arrangement being such that the bus bar assembly will be clamped together to maintain the conductors and insulators in compression thereby providing maximum resistance to short circuits and ground stresses.

2. Apparatus as set forth in claim 1, wherein each of said current carrying conductors is positioned with one of its side walls opposite and extending parallel to one of the side walls of said neutral conductor and wherein each of said insulators is clamped between the opposing side walls of the neutral conductor and one of the current carrying conductors and said two-piece member is in the form of a duct made of elongated upper and lower members, the construction and arrangement being such that the bus bars and the insulators are held together by clamping in a unitary assembly, thereby facilitating assembly and disassembly of the apparatus.

3. Apparatus as set forth in claim 2, wherein the upper and lower members of said duct are semi-hexagonal in transverse cross section and the three current carrying conductors, in their equilateral triangle formation, are mounted in the duct so that each conductor extends opposite and in parallel relation with one of the side walls of the duct.

4. Apparatus as set forth in claim 2, including two-piece frame members spaced longitudinally along the run of the conductors with each frame member encircling said conductors and carrying insulators positioned to engage and support the three current carrying conductors.

5. Apparatus as set forth in claim 4, wherein said duct is formed of upper and lower elongated parts, each semi-hexagonal in transverse cross section and provided with laterally projecting flanges along its edges, the flanges on the lower part being provided with upturned edges and the flanges on the upper part being provided with downturned edges engaging the upturned edges of the lower part, thereby forming a channel between the flanges of the two parts, and bolt means for securing the flanges of the two parts together; and wherein each of said frame members is formed of upper and lower semi-hexagonal parts, the lower part having outwardly projecting flanges formed on each end and the upper part having corresponding outwardly projecting flanges formed on each end engaging the flanges on the lower part to form opposed flanges on the frame projecting into the channels formed in said duct.

References Cited in the file of this patent

UNITED STATES PATENTS

| | | |
|---|---|---|
| 1,563,859 | Jacobs | Dec. 1, 1925 |
| 2,084,580 | Frank | June 22, 1937 |
| 2,293,310 | Rudd | Aug. 18, 1942 |
| 2,400,223 | Cole et al. | May 14, 1946 |
| 2,439,956 | Wagner et al. | Apr. 20, 1948 |
| 2,445,463 | West | July 20, 1948 |
| 2,749,385 | Adam | June 5, 1956 |
| 2,767,241 | Zuch | Oct. 16, 1956 |
| 2,815,396 | Bartlett | Dec. 3, 1957 |
| 2,824,901 | Reichert et al. | Feb. 25, 1958 |

FOREIGN PATENTS

| | | |
|---|---|---|
| 881,083 | Germany | June 25, 1953 |
| 949,670 | Germany | Sept. 27, 1956 |